(12) United States Patent
Flister et al.

(10) Patent No.: US 12,521,929 B2
(45) Date of Patent: Jan. 13, 2026

(54) PROCESS FOR PRODUCING THERMOPLASTIC SHEETS

(71) Applicants: Carlos Walter Flister, São Leopoldo (BR); Helmut Johan Ducatti Flister, Novo Hamburgo (BR); CIRTECH GLOBAL SPA, Santiago (CL)

(72) Inventors: Carlos Walter Flister, São Leopoldo (BR); Helmut Johan Ducatti Flister, Novo Hamburgo (BR)

(73) Assignees: Helmut Ducatti Flister, Novo Hamburgo (BR); Carlos Walter Flister, São Leopoldo (BR); CIRTECH GLOBAL SPA, Santiago (CL)

( * ) Notice: Subject to any disclaimer, the term of this patent is extended or adjusted under 35 U.S.C. 154(b) by 39 days.

(21) Appl. No.: 17/766,108

(22) PCT Filed: Sep. 30, 2020

(86) PCT No.: PCT/BR2020/050393
§ 371 (c)(1),
(2) Date: Apr. 1, 2022

(87) PCT Pub. No.: WO2021/062506
PCT Pub. Date: Apr. 8, 2021

(65) Prior Publication Data
US 2022/0410457 A1    Dec. 29, 2022

(30) Foreign Application Priority Data
Oct. 1, 2019    (BR) .......................... 1020190206586

(51) Int. Cl.
*B29C 48/00*    (2019.01)
*B29C 48/07*    (2019.01)
(Continued)

(52) U.S. Cl.
CPC ...... *B29C 48/0021* (2019.02); *B29C 48/0022* (2019.02); *B29C 48/022* (2019.02);
(Continued)

(58) Field of Classification Search
None
See application file for complete search history.

(56) References Cited

U.S. PATENT DOCUMENTS

| | | | |
|---|---|---|---|
| 4,396,665 A | 8/1983 | Rowe | |
| 4,671,040 A | 6/1987 | Braithwaite, Jr. | |
| (Continued) | | | |

FOREIGN PATENT DOCUMENTS

| | | | | |
|---|---|---|---|---|
| JP | 2951042 B2 | * | 9/1999 | ......... B29C 47/0019 |

OTHER PUBLICATIONS

International Search Report for related International Application No. PCT/BR2020/050393; report dated Apr. 8, 2021; (7 pages).
(Continued)

*Primary Examiner* — Yung-Sheng M Tsui
(74) *Attorney, Agent, or Firm* — K&L Gates LLP

(57) ABSTRACT

The present disclosure relates to the process of producing thermoplastic, smooth and/or corrugated tile type board, based on new polymers or polymeric waste, pure and or composed of various plastics, whether or not chemically compatible, with or without fillers, natural/industrial/mineral/animal, individually and/or combined up to 80% by lamination process, in single or multilayer form, using various melting process mechanisms; and also allowing the interlayer and/or superficial introduction of bodies, rigid or flexible, for the purpose of structural reinforcement and or surface finishing, characterized by using an extruder that delivers a large volume of plastic mass to the lamination line, where the already laminated plastic mass passes to the molecular fixing line, through cool pressing plates, moving
(Continued)

into to the cutting line, through the side cutting and dividing saw, being the product sent to completion section, through the square cutting and deposition on distribution table.

8 Claims, 3 Drawing Sheets

(51) Int. Cl.
  *B29C 48/305* (2019.01)
  *B29K 101/12* (2006.01)
  *B29L 7/00* (2006.01)

(52) U.S. Cl.
  CPC ............ B29C 48/07 (2019.02); B29C 48/305 (2019.02); *B29K 2101/12* (2013.01); *B29L 2007/002* (2013.01)

(56) References Cited

U.S. PATENT DOCUMENTS

| | | |
|---|---|---|
| 5,318,737 A | 6/1994 | Trabert et al. |
| 5,401,154 A | 3/1995 | Sargent |
| 5,615,523 A | 4/1997 | Wells et al. |
| 6,536,177 B1 | 3/2003 | Italiane et al. |
| 6,663,733 B2 * | 12/2003 | Nagaya .................. B29C 48/08 156/244.27 |
| 8,017,052 B2 | 9/2011 | Mackinnon et al. |
| 2004/0109910 A1 * | 6/2004 | Plammer ................. B29C 48/12 425/363 |

OTHER PUBLICATIONS

Written Opinion for related International Application No. PCT/BR2020/050393; report dated Apr. 8, 2021; (12 pages).

* cited by examiner

FIG. 04
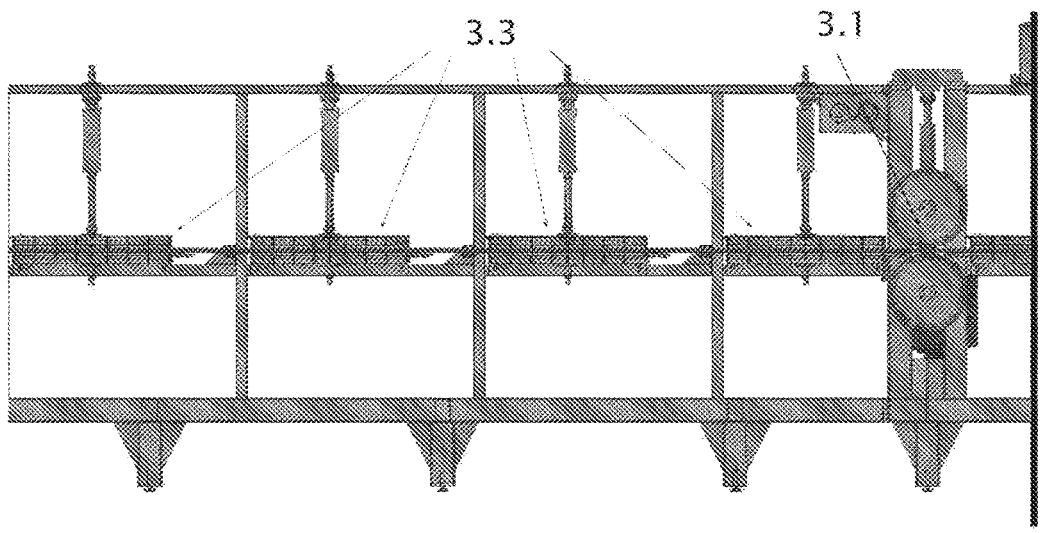
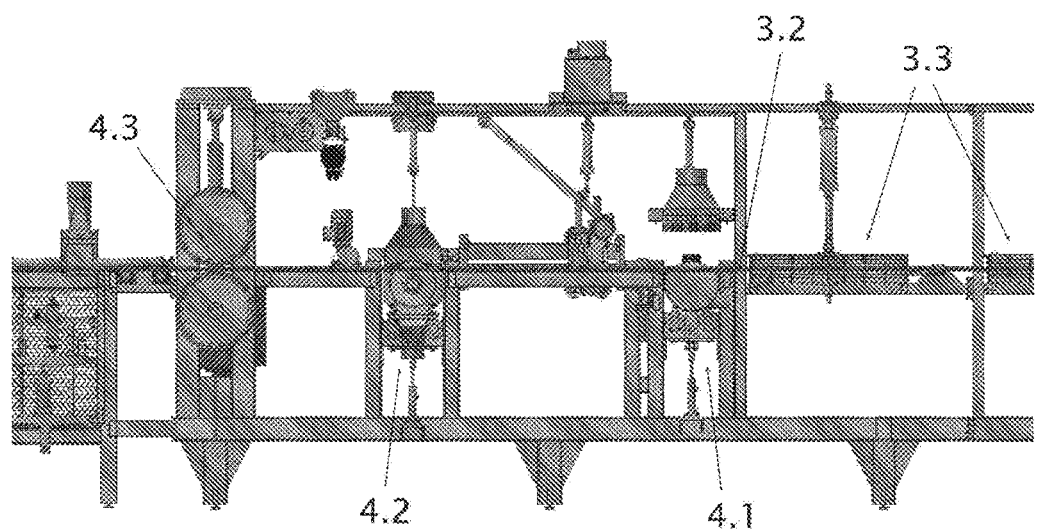
FIG. 05
FIG. 06
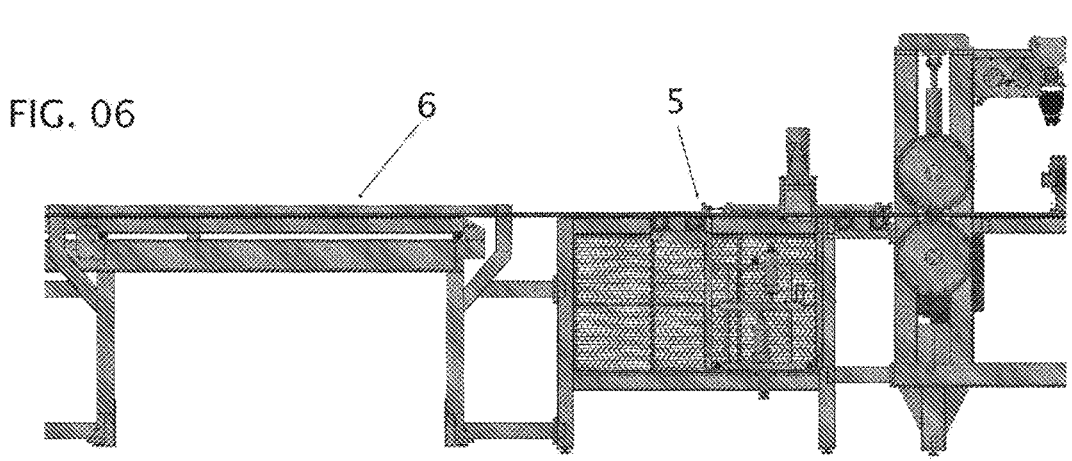

PROCESS FOR PRODUCING THERMOPLASTIC SHEETS

CROSS-REFERENCE TO RELATED APPLICATIONS

The present application is a National Stage of International Application No. PCT/BR2020/050393 filed on Sep. 30, 2020, which claims the benefit of Brazilian Application No. 102019020658.6, filed on Oct. 1, 2019, the entire contents of each hereby incorporated by reference.

FIELD

The following descriptive report for the disclosure relates to the process of producing thermoplastic, smooth and/or corrugated tile type board, based on new polymers or polymeric waste, pure and or composed of various plastics, whether or not chemically compatible, with or without fillers, natural/industrial/mineral/animal, individually and/or combined up to 80% by lamination process, in single or multilayer form, using various melting process mechanisms; and also allowing the interlayer and or superficial introduction of bodies, rigid or flexible, for the purpose of structural reinforcement and or surface finishing.

BACKGROUND

Lamination is a plastic forming process that involves the passage of a body between two cylinders so that its thickness decreases, while the width and length of the body are proportionally increased.

The polymer lamination process is known, for example, the document FR9700305 describes a process for the manufacture of thermoformable sheets and/or plates from a temperature of 80° C.-90° C., usable as a self-adhesive reinforcement material, characterized by the fact that: from 30 to 70% by weight of granules of low melting weight (50° C. to 90° C.) polymer(s) thermoformable from a temperature of 80° C.-90° C. with 70 to 30% by weight of melt point polymer(s) melting or higher softening in granules or in powder with a granulometry greater than about 500 µm, preferably from 500 to 1000 µm, both types of polymers being thermoplastic and fully or partially compatible, with possibly the usual additives, the mixture is extruded in low shear conditions with low temperatures of 100 to 140° C. giving the mixture a pasty consistency insufficient to form a homogeneous mixture of molten polymers, after this extrusion and eventual addition of a support (9, 12) in the extruded product, the product is rolled or calendered under high pressure at a temperature of 100° C. to reduce the thickness and cooled to a temperature below 30° C. before the end of rolling or calendering.

Lamination is not used in any other polymer processing.

It consists of an idea of product formation through lamination, where the classical volumetric variations, derived from typical oscillations in the waste or new polymers extrusion, with flow index variations from extrusion to injection molding indexes.

SUMMARY

The description of the present disclosure is done by means of representative drawings of the thermoplastic board production process, such that the product can be fully reproduced by suitable technique, allowing full characterization of the functionality of the claimed object.

As shown in the images that express the best or preferable method of making the designed product, the descriptive part of the report is based, through a detailed and consecutive numbering, where it clarifies aspects that may be implied by the representation adopted, so as to clearly determine the intended protection.

BRIEF DESCRIPTION OF THE DRAWINGS

All images are for illustration purposes only and may vary without leaving the scope of the claims. In these embodiments:

FIG. 4 shows the thermofixing line by plates:

FIG. 5 shows the side cutting saw, dividing saw and sending off; and

FIG. 6 shows the completion of the process with square cutting and receiving table.

DETAILED DESCRIPTION

Figure 1:
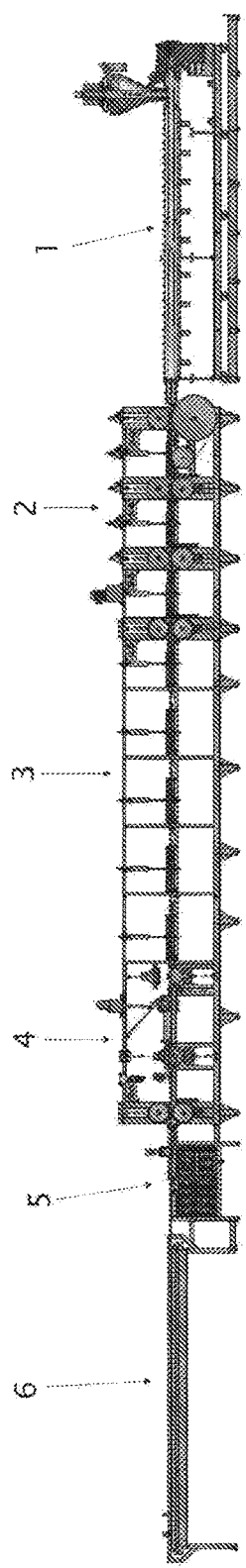
FIG. 1 shows the complete production unit containing the extruder, lamination/thermofixing line, screw saw and receiving table.
Figure 2:
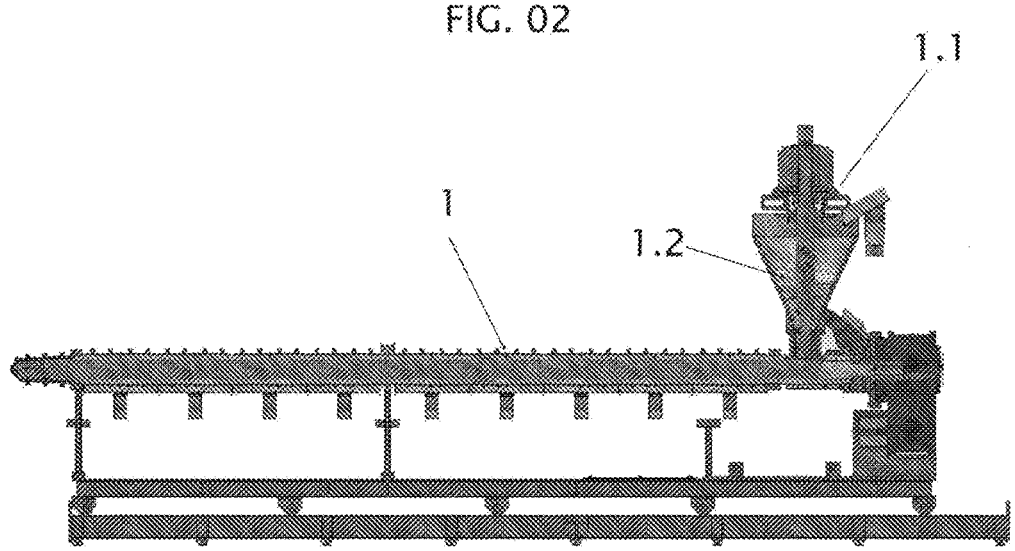
FIG. 2 shows the extruder.
Figure 3:
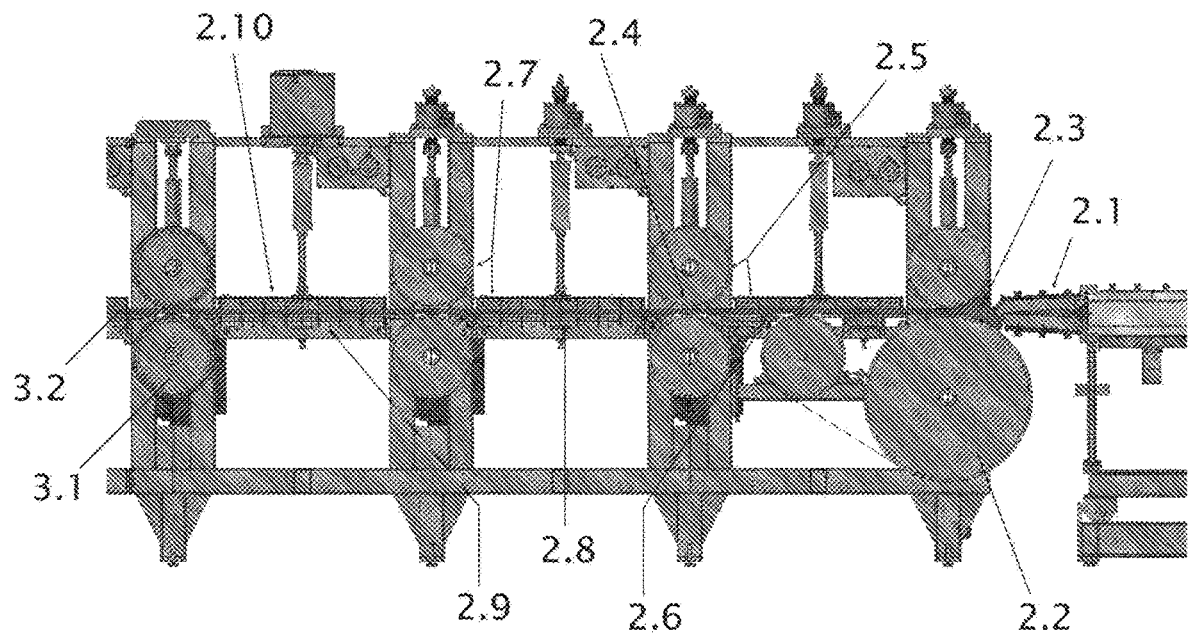
FIG. 3 shows the lamination and hardening line.

The thermoplastic plate production process uses an extruder (1) with temperatures from 100 to 450° C., which delivers a large volume of plastic mass to the lamination line (2), where the already laminated plastic mass passes to molecular fixing line (3), through cool pressing plates, passing to the cutting line (4), through the side cutting saw and dividing saw, sending the product to completion through the square cutting (5) and deposition on distribution table (6).

Plastification/gelling/melting of the mass shall be by:
a. Extrusion by a high pressure and diffusion extruder (1), operating at up to 1000 bar pressure, fed by a high pressure doser system (1.1) and high pressure compactor (1.2), operating at up to 500 bar, in order to provide a uniform feed and minimize density bulk variations in waste; and,
b. Optionally plastification, gelling, and/or melting can be performed by other continuous or batch plastification systems.

The introduction of a lamination system (non-calender) offers plastic mass absorption from an extruder or any other continuous or batch plastification system, accumulating an desired volume, thereby compensating for volumetric variation, and then forming the product via the laminator cylinder and not by flat die, in others words, it absorbs here the typical volumetric variations in waste extrusion.

Another innovation presented is that, throughout a multiple laminating system, it allows the recompression/hardening of the mass in order to reduce internal expansions from typical waste gases, thus allowing the production of profile up to 200 mm thickness, in width of up to 6,000 mm.

Also, the project foresees the molecular fixation, in addition to the laminator cylinders, through the introduction of a cool pressing plates system, offering molecular fixing until the complete thermal stabilization of the product.

The production process involves inserting the gelled mass by means such as flat die (2.1) for pre-forming the mass and introducing it into the first lamination group (2.2) which includes an accumulator (2.3). This ensures the absorption of volumetric oscillations from the laminating equipment, forming the primary profile of the final product. After that, the pre-formed mass is by hand and/or automatically moved into the second lamination group (2.4), where recompression, pre-hardening and gas exhaustion by compression phase (2.5) occur, and the mass is held by cool press plates in between the two lamination groups (2.6) to start molecular fixing. In the second lamination group, the material is automatically sent towards the next lamination groups, for hardening (2.7), always intermediated by cool pressing plates (2.8 and 2.9), until it reaches a molecular fixing (2.10) point ensuring the final geometry desired.

After completion of lamination, a first puller (3.1) up to 50,000 kg/f pulls the formed product (3.2), and sends it to a group of cool pressing plates (3.3), until final molecular fixing desired.

In the same process, the produced board (3.2) is cut to define desired width through the side cutting saw (4.1), divided lengthwise according to defined profiles, automatically cut lengthwise through the dividing saw (4.2), being pulled by a second puller (4.3), where this material is cut by the square cutting saw (or square cutter) (5) and automatically sent to a distribution table (6).

Additional inline surface finishing options such as texturizing, machining, polishing, grinding, brushing, printing, grooving, painting and hot stamping may be utilized.

The invention claimed is:

1. A thermoplastic board production process comprising:
    feeding a molten plastic mass to an extruder that operates at temperatures between 100° C. and 450° C., wherein the molten plastic mass is fed to the extruder by a high pressure doser system and high pressure compactor;
    rolling the plastic mass in a rolling line, wherein the rolling comprises:
        pre-forming the plastic mass from the extruder, wherein the plastic mass is pre-formed by a flat die;
        absorbing volumetric variations of the plastic mass from the flat-die, wherein the plastic mass variations are absorbed by an accumulator;
        rolling the plastic mass through a first pair of rollers of a first rolling group that receives the plastic mass from the accumulator;
        passing the plastic mass through cool pressing plates of the first rolling group, said cool pressing plates positioned after the first pair of rollers;
        rolling the plastic mass through a second pair of rollers of a second rolling group that receives the plastic mass from the first rolling group;
        passing the plastic mass through cool pressing plates of the second rolling group, said cool pressing plates positioned after the second pair of rollers;
        hardening the plastic mass through a third pair of rollers of a hardening rolling group that receives the plastic mass from the second rolling group; and
        passing the plastic mass through cool pressing plates of the hardening rolling group, forming a board, said cool pressing plates positioned after the third pair of rollers;
    pulling the board from the hardening rolling group, wherein the board is pulled by a first puller that directs the board to a group of cool pressing plates of a molecular fixing line;
    cutting the board in a cutting line-comprising a side cutting saw to define final width of the board, a dividing saw to optionally cut the board lengthwise, a second puller to move the board through the cutting line, and a square cutting saw for final cutting of the board; and
    delivering the board from the cutting line in a receiving table.

2. A rolling system for the production of thermoplastic plates from a molten plastic mass, the system comprising:
    an extruder that receives the molten plastic mass, wherein the extruder operates at temperatures between 100° C. and 450° C., and wherein the molten plastic mass is fed to the extruder by a high pressure doser system and high pressure compactor;
    a rolling line that receives the plastic mass from the extruder, said rolling line comprising:
    a flat die for pre-forming the plastic mass from the extruder;
    an accumulator for absorbing volumetric variations of the plastic mass from the flat-die;
    a first rolling group that receives the plastic mass from the accumulator, wherein the first rolling group comprises a first pair of rollers and cool pressing plates positioned after the first pair of rollers;
    a second rolling group that receives the plastic mass from the first rolling group, wherein the second rolling group comprises a second pair of rollers and cool pressing plates positioned after the second pair of rollers; and
    a hardening rolling group that receives the plastic mass from the second rolling group, wherein the hardening rolling group comprises a third pair of rollers and cool pressing plates positioned after the third pair of rollers, forming a board;
    a first puller arranged after the rolling line, which pulls the board from the hardening rolling group;
    a molecular fixing line, comprising a group of cool pressing plates that receives the board from the first puller; and
    a cutting comprising:
        a side cutting saw to define final width of the board;
        a dividing saw to optionally cut the board lengthwise;
        a second puller to advance the board; and
        a square cutting saw for final cutting of the board; and
        a receiving table to collect the board after the cutting line.

3. The process of claim 1, wherein the extruder operates at a pressure of up to 1000 bar.

4. The process of claim 1, wherein the high pressure doser system and the high pressure compactor operate at pressures of up to 500 bar.

5. The process of claim 1, wherein the first puller exerts a pulling force of up to 50,000 kg/f.

6. The system of claim 2, wherein the extruder operates at a pressure of up to 1000 bar.

7. The system of claim 2, wherein the high pressure doser system and high pressure compactor operate at pressures of up to 500 bar.

8. The system of claim 2, wherein the first puller is configured to exert a pulling force of up to 50,000 kg/f.

* * * * *